(12) United States Patent
Stacey et al.

(10) Patent No.: US 9,866,354 B2
(45) Date of Patent: Jan. 9, 2018

(54) FRAGMENTATION OF SERVICE DATA UNITS IN A HIGH-EFFICIENCY WIRELESS LOCAL-AREA NETWORK

(71) Applicant: Intel IP Corporation, Santa Clara, CA (US)

(72) Inventors: Robert J. Stacey, Portland, OR (US); Yaron Alpert, Hod Hasharoni (IL); Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 55 days.

(21) Appl. No.: 14/964,768

(22) Filed: Dec. 10, 2015

(65) Prior Publication Data

US 2017/0019880 A1    Jan. 19, 2017

Related U.S. Application Data

(60) Provisional application No. 62/192,675, filed on Jul. 15, 2015.

(51) Int. Cl.
*H04W 28/06* (2009.01)
*H04L 29/08* (2006.01)
*H04L 5/00* (2006.01)
*H04W 84/12* (2009.01)

(52) U.S. Cl.
CPC .......... *H04L 5/0007* (2013.01); *H04L 69/324* (2013.01); *H04W 28/065* (2013.01); *H04W 84/12* (2013.01)

(58) Field of Classification Search
CPC ... H04W 72/04; H04W 28/065; H04W 84/12; H04L 5/00; H04L 69/324
See application file for complete search history.

(56) References Cited

U.S. PATENT DOCUMENTS

| 2003/0133427 | A1* | 7/2003 | Cimini, Jr. | ............ H04W 28/06 370/338 |
| 2003/0152058 | A1* | 8/2003 | Cimini, Jr. | .............. H04L 47/10 370/338 |
| 2004/0218630 | A1* | 11/2004 | An | .......................... H04L 47/10 370/470 |
| 2005/0204247 | A1* | 9/2005 | Guo | ...................... H04L 1/1854 714/746 |

(Continued)

*Primary Examiner* — Jenee Holland
(74) *Attorney, Agent, or Firm* — Schwegman Lundberg & Woessner, P.A.

(57) ABSTRACT

Apparatuses, methods, and computer readable media are disclosed for fragmentation of media access control service data units (MSDU) in a high-efficiency wireless local-area network. An apparatus of a access point or station comprising memory and processing circuitry coupled to the memory is disclosed. The processing circuitry is configured to fragment a media access control (MAC) service data unit (MSDU) into two or more MSDU fragments, and encapsulate the two or more MSDU fragments into two or more aggregated MSDUs (A-MSDUs); one or more A-MSDUs and one or more MAC protocol data units (MPDUs); or, two or more MPDUs. The processing circuitry may be further configured to encode a delimiter in front of a first fragment of the two or more MSDU fragments, where the delimiter indicates a length of the two or more MSDU fragments, and to encode each MPDU to comprise a sequence number.

19 Claims, 6 Drawing Sheets

(56) References Cited

U.S. PATENT DOCUMENTS

| | | | | |
|---|---|---|---|---|
| 2005/0220145 A1* | 10/2005 | Nishibayashi | H04W 99/00 | 370/474 |
| 2005/0238054 A1* | 10/2005 | Sharma | H04L 1/1642 | 370/473 |
| 2006/0215626 A1* | 9/2006 | Ross | H04B 7/2621 | 370/344 |
| 2007/0147284 A1* | 6/2007 | Sammour | H04J 3/0605 | 370/328 |
| 2007/0186134 A1* | 8/2007 | Singh | H04L 1/1614 | 714/749 |
| 2007/0206508 A1* | 9/2007 | Sammour | H04W 28/06 | 370/252 |
| 2007/0258384 A1* | 11/2007 | Sammour | H04W 36/24 | 370/252 |
| 2007/0266292 A1* | 11/2007 | Korndewal | H04L 1/188 | 714/749 |
| 2007/0297375 A1* | 12/2007 | Bonta | H04W 28/06 | 370/338 |
| 2008/0117919 A1* | 5/2008 | Kliger | H04L 69/324 | 370/400 |
| 2008/0150675 A1* | 6/2008 | Hirano | H04L 1/1838 | 340/5.1 |
| 2008/0159190 A1* | 7/2008 | Tsao | H04L 1/1874 | 370/310 |
| 2008/0165968 A1* | 7/2008 | Yadav | H04W 12/02 | 380/270 |
| 2008/0192774 A1* | 8/2008 | Singh | H04L 1/1867 | 370/473 |
| 2010/0014463 A1* | 1/2010 | Nagai | H04B 7/0695 | 370/328 |
| 2010/0074263 A1* | 3/2010 | Bry | H04L 12/2834 | 370/401 |
| 2010/0142555 A1* | 6/2010 | Yang | H04W 28/06 | 370/473 |
| 2010/0238932 A1* | 9/2010 | Kliger | H04L 12/4633 | 370/392 |
| 2012/0014335 A1* | 1/2012 | Adachi | H04W 48/08 | 370/329 |
| 2013/0208734 A1* | 8/2013 | Wentink | H04B 1/3838 | 370/474 |
| 2014/0126559 A1* | 5/2014 | Lynch | H04L 49/901 | 370/338 |

* cited by examiner

FRAGMENTATION OF SERVICE DATA UNITS IN A HIGH-EFFICIENCY WIRELESS LOCAL-AREA NETWORK

PRIORITY CLAIM

This application claims the benefit of priority under 35 USC 119(e) to U.S. Provisional Patent Application Ser. No. 62/192,675, filed Jul. 15, 2015, which is incorporated herein by reference in their entirety.

TECHNICAL FIELD

Embodiments relate to access points or stations. Some embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to fragmenting media access control service data units (MSDU). Some embodiments relate to generating, transmitting, receiving aggregated, and/or fragmented MSDUs.

BACKGROUND

Efficient use of the air resources of a wireless local-area network (WLAN) is important to provide bandwidth and acceptable response times to the users of the WLAN. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
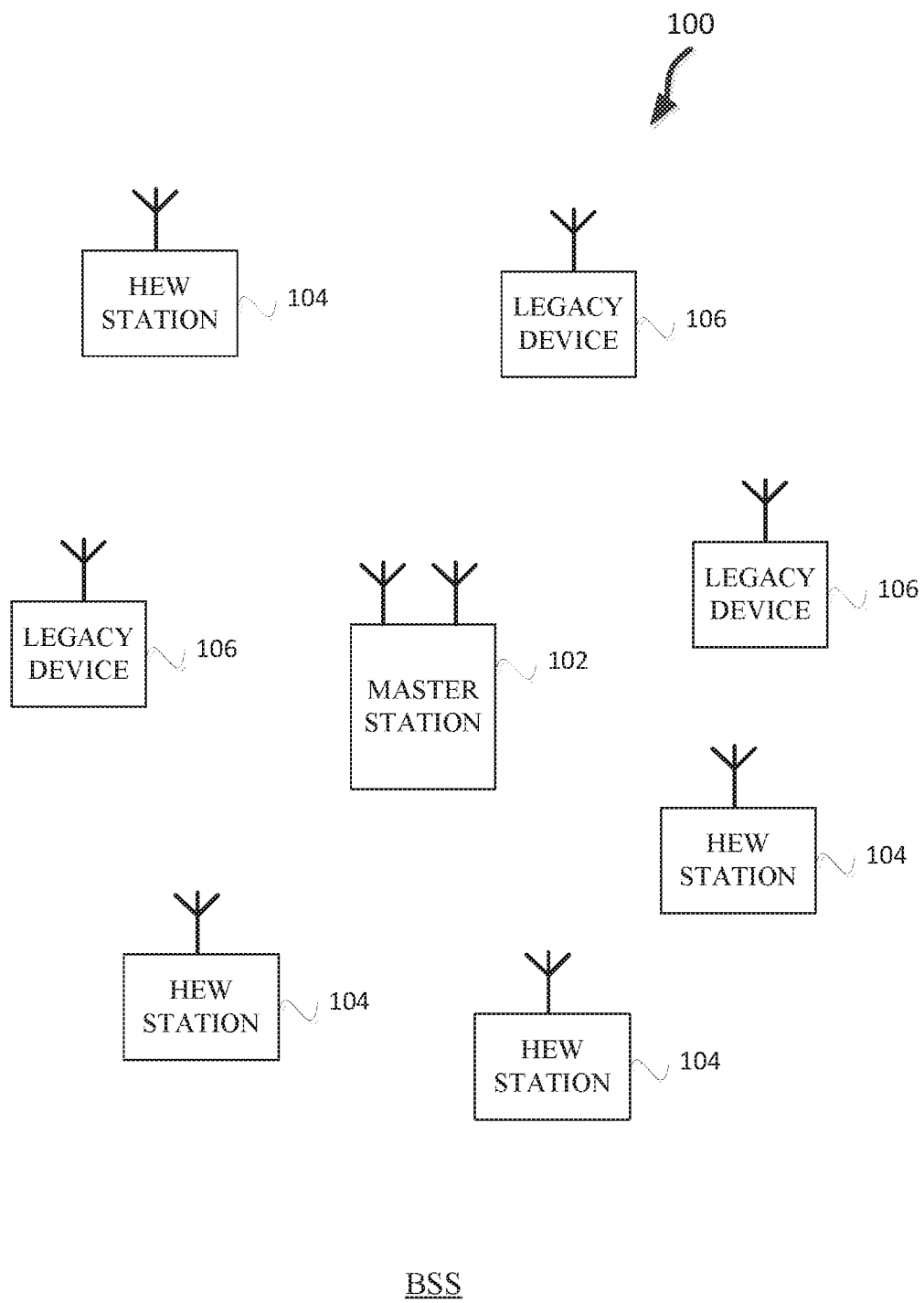
FIG. 1 illustrates a wireless network in accordance with some embodiments.

FIG. 1 illustrates a WLAN 100 in accordance with some embodiments. The WLAN may comprise a basis service set (BSS) 100 that may include one or more master stations 102, a plurality of high-efficiency wireless (HEW) (e.g., IEEE 802.11ax) STAs 104 and a plurality of legacy (e.g., IEEE 802.11n/ac) devices 106. Each of the one or more master stations 102 may be an AP and/or one or more virtual APs (VAPs), and each master station 102 may be distributed, co-located, or integrated.

The master station 102 may be an AP and/or multi VAPs using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 may be associated or connected to one or more HEW stations 104 and/or legacy devices 106.

The legacy devices 106 may operate in accordance with one or more of IEEE 802.11 a/b/g/n/ac/ad/af/ah/aj/ay, 3rd Generation Partnership Project (3GPP), Long Term Evolution, or another legacy wireless communication standard. The legacy devices 106 may be STAs or IEEE STAs. The HEW STAs 104 may be wireless transmit and receive devices such as cellular telephone, smart telephone, hand-held wireless device, wireless glasses, wireless watch, wireless personal device, tablet, wireless repeater, wireless point-to-point, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The operating bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a resource allocate element (e.g., a trigger frame for uplink or an HE SIG-B for downlink) or HEW control and schedule transmission at the beginning of the HEW control period. The schedule transmission may be for a short (current transmission) and/or a long term. The master station 102 may transmit a time duration of the TXOP and sub-channel information. During the HEW control period, HEW STAs 104 may communicate with the master station 102 in accordance with a non-contention based simultaneous multiple access technique such as OFDMA or MU-MIMO. This is unlike conventional WLAN communications in which devices communicate in accordance with a contention-based communication technique, rather than a multiple access technique. During the HEW control period, the master station 102 may communicate with one or more HEW stations 104 using one or more HEW frames. During the HEW control period, the HEW STAs 104 may operate on one or more sub-channels smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the resource allocate element (for example trigger frame) may indicate an uplink (UL) UL-MU-MIMO and/or UL OFDMA control period.

In some embodiments, the simultaneous multiple-access technique used during the HEW control period may be a scheduled OFDMA technique, although this is not a requirement. In some embodiments, the simultaneous multiple access technique may be a time-division multiple access (TDMA) technique or a frequency division multiple access (FDMA) technique. In some embodiments, the simultaneous multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-6.

Figure 2:
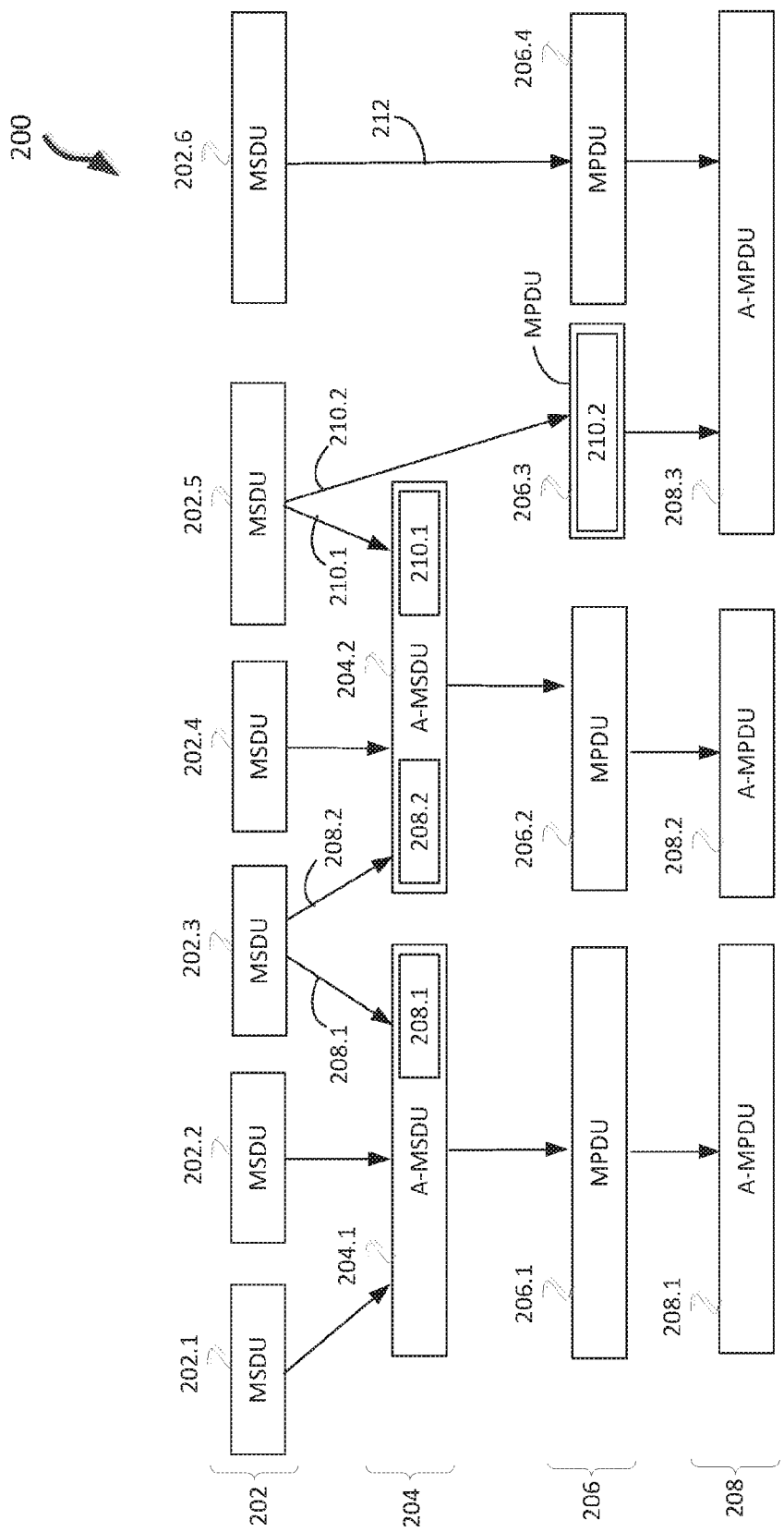
FIG. 2 illustrates a method of fragmentation of service data units in a high-efficiency wireless local-area network in accordance with some embodiments.

FIG. 2 illustrates a method 200 of fragmentation of service data units in a high-efficiency wireless local-area network in accordance with some embodiments. Illustrated in FIG. 2 are media access control (MAC) service data units (MSDUs) 202, aggregated MSDUs (A-MSDUs) 204, MAC protocol data units (MPDUs) 206, and aggregated MPDUs (A-MPDUs) 208. The MSDUs may be data from the MAC level for delivery to another MAC. A-MSDU 204 are one or more MSDUs 202 aggregated together. MPDUs are frames. A-MPDUs 208 are aggregated MPDUs 208. The MPDUs may be separated by MPDU delimiters in the A-MPDUs 208.

The MSDUs 202 may be fragmented and encapsulated in one or more A-MSDUs 204. The MSDUs 202 may be fragmented into two or more fragments or portions. For example, MSDU 202.1, MSDU 202.2, and a first fragment 208.1 of MSDU 202.3 may be encapsulated in A-MSDU 204. A second fragment 208.2 of MSDU 202.3 may be encapsulated in A-MSDU 204.2 with MSDU 202.4 and a first fragment 210.1 of MSDU 202.5. A master station 102 or HEW station 104 may be configured to fragment the MSDU 202 and perform the functions and/or steps described in conjunction with FIG. 2. The master station 102 and/or HEW station 104 may fragment the MSDU 202 to fit a size of the A-MSDUs 204. A second fragment 210.2 of MSDU 202.5 may be encapsulated directly into MPDU 206.3. The entire MSDU 202.6 may be encapsulated completely in MPDU 206.4. A-MSDU 204.1 may be encapsulated into MPDU 206.1. A-MSDU 204.2 may be encapsulated into 206.2.

The MPDUs 206 may then be aggregated into A-MPDUs 208. For example, MPDU 206.1 may be placed directly in A-MPDU 208.1. MPDU 206.2 may be placed directly in A-MPDU 208.2. MPDU 206.3 and MPDU 206.4 may be placed into A-MPDU 208.3.

Figure 3:
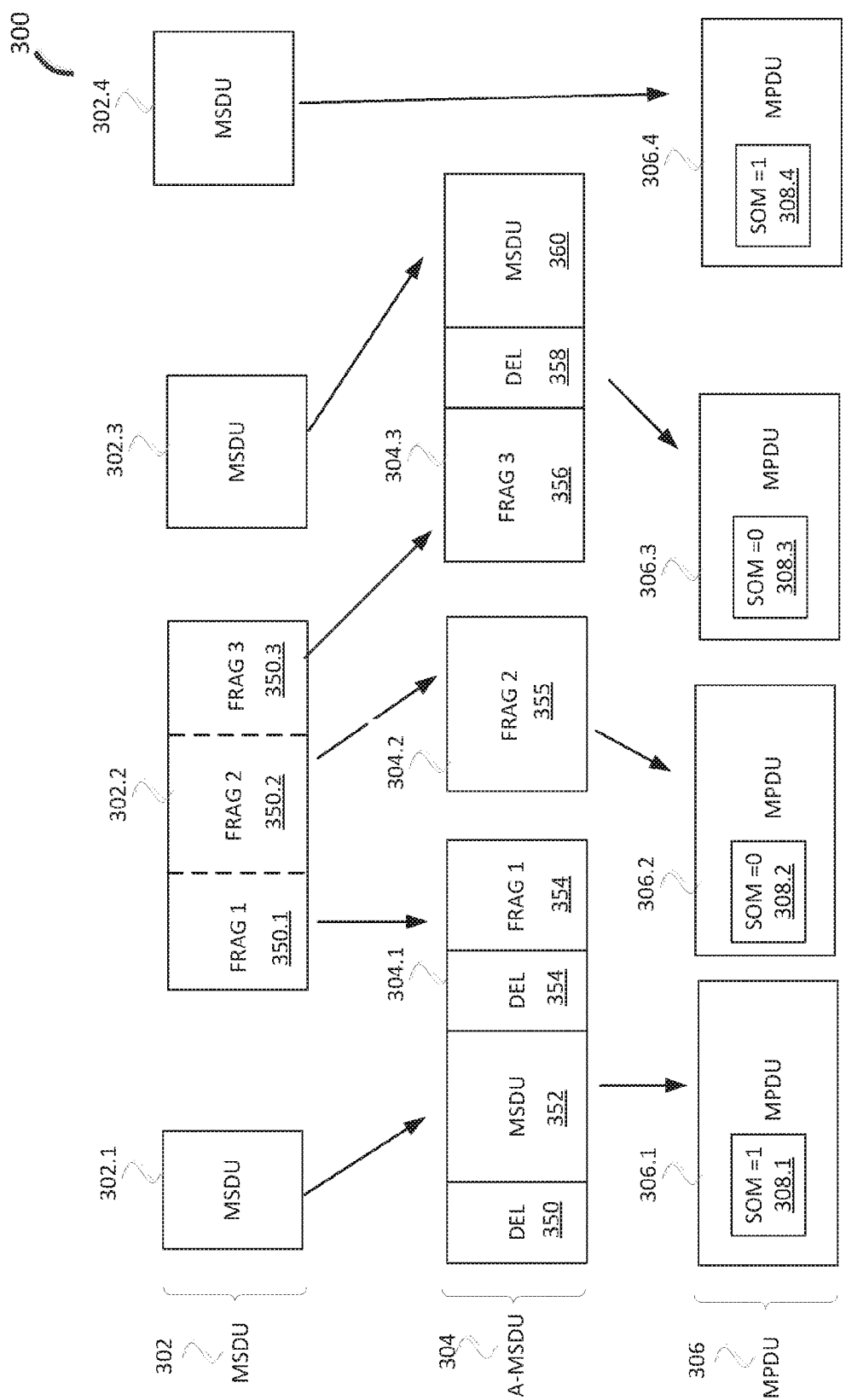
FIG. 3 illustrates a method of fragmentation of service data units in a high-efficiency wireless local-area network in accordance with some embodiments.

FIG. 3 illustrates a method 300 of fragmentation of service data units in a high-efficiency wireless local-area network in accordance with some embodiments. Illustrated in FIG. 3 are MSDUs 302, A-MSDU 304, and MPDUs 304. The MSDU 302 are aggregated into A-MSDUs 304. For example, MSDU 302.1 and fragment 1 350.1 of MSDU 302.2 are aggregated into A-MSDU 304.1. Delimiter 350 is inserted before MSDU 352. The delimiter 350 includes a length of the MSDU 352. The delimiter 354 is inserted before fragment 1 354 of MSDU 302.2. The delimiter 354 includes a length of fragment 1 354, fragment 2 355, and fragment 3 356. The length included in the delimiter 354 may be used to determine that MSDU 302.2 is fragmented. The length of the fragments 350 of MSDU 302.2 may be based on the size of the A-MSDUs 304 in order to fill the A-MSDUs 304. Fragment 2 350.2 of MSDU 302.2 may be placed directly in A-MSDU 304.2 as fragment 2 355. There may be no delimiter in front of fragment 2 355.

Fragment 3 350.3 of MSDU 302 may be placed in A-MSDU 304.3 as fragment 3 356. MSDU 302.3 may be aggregated with fragment 3 356 in A-MSDU 304. The delimiter 358 may be inserted before MSDU 360. The delimiter 358 may include the length of MSDU 360.

A-MSDU 304 may be encapsulated into MPDUs 306. For example, A-MSDU 304.1 may be encapsulated into MPDU 306.1. Start of message (SOM) 308.1 may be set (e.g., to 1) to indicate that the first portion of MPDU 306.1 is a delimiter for the start of a MSDU 302. MSDU 302.2 is located at the end of A-MSDU 304.1. A-MSDU 304.2 may be encapsulated in MPDU 306.2. In some embodiments, SOM 308.2 is not set (e.g., value of 0) to indicate that MPDU 306.2 does not begin with a delimiter of a MSDU 304. The SOM 308.2 is not set (e.g., value of 0) to indicate that a non-first fragment of a fragmented MSDU is encapsulated in the A-MPDU. For example, MSDU 350.2 is encapsulated in a A-MSDU 304.2, and then encapsulated in MPDU 306.2 with a the SOM=0 308.2 to indicate that the non-first fragment 2 350.2 is encapsulated in A-MSDU 304.2 and then encapsulated in MPDU 306.2.

A-MSDU 304.3 may be encapsulated in MPDU 306.3. In some embodiments, SOM 308.3 is not set (e.g., value of 0) to indicate that MPDU 306.2 does not begin with a delimiter of a MSDU 304. In some embodiments, SOM 308.3 is not set (e.g., value of 0) to indicate that a non-first fragment of a fragmented MSDU is encapsulated in an A-MSDU to be encapsulated in the MPDU 306.3. In some embodiments, the master station 102 and/or HEW station 104 determines that fragment 3 356 is the last fragment of a fragmented MSDU 302 based on the next portion of a A-MSDU 304 being a delimiter. For example, the master station 102 and/or HEW station 104 may determine that fragment 3 356 is the last fragment of the fragmented MSDU 302.2 based on the delimiter 358.

MSDU 302.4 may be directly encapsulated into an MPDU 306.4. The SOM may be set (e.g., SOM=1) to indicate that the MSDU 302.4 begins with a delimiter (not illustrated.)

In some embodiments, when an A-MSDU 304 has two fragments, one a last fragment and one a first fragment that the SOM is set (e.g., SOM=1). In some embodiments, an A-MSDU 304 may be fragmented after a transmission fail where the number of fragments may be limited, e.g. 2. In some embodiments, the fragment 3 350.3 may be encapsulated into a MPDU 306 directly without first being encapsulated into an A-MSDU. The MPDUs 306 may be encapsulated in A-MPDUs as described in conjunction with FIG. 2 (e.g., fragment 210.2 is encapsulated directly into MPDU 206.3.)

Figure 4:
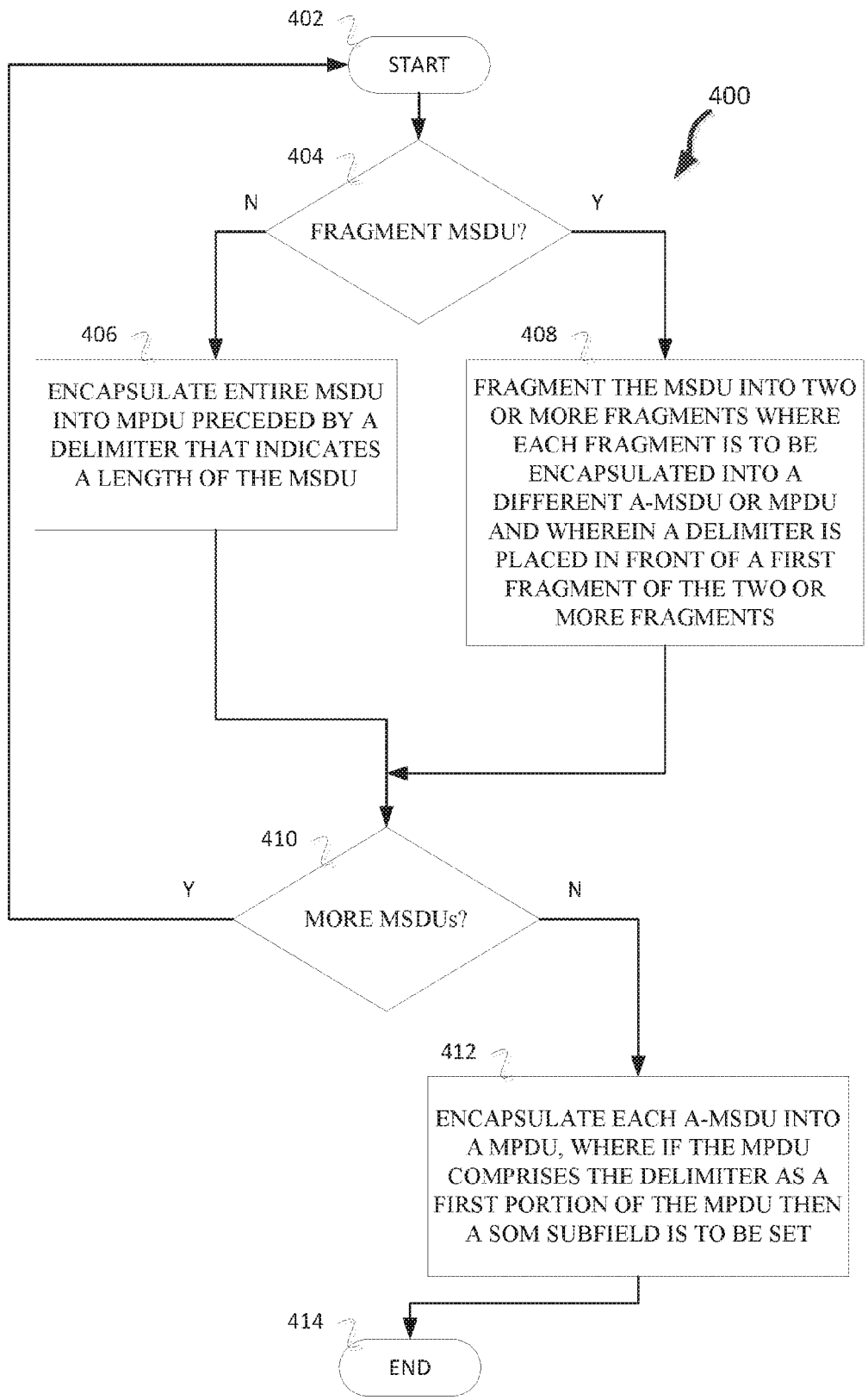
FIG. 4 illustrates a method of fragmentation of service data units in a high-efficiency wireless local-area network in accordance with some embodiments.

FIG. 4 illustrates a method 400 of fragmentation of service data units in a high-efficiency wireless local-area network in accordance with some embodiments. The method 400 begins at operation start 402. The method 400 continues at operation 404 with fragment MSDU. A master station 102 and/or HEW station 104 may determine whether or not an MSDU should be fragmented or not. The master station 102 and/or HEW station 104 may base the determination of whether or not to fragment the MSDU on one or more of the following scheduling, link condition, station capability, and/or quality of service. The determination may be based on a current A-MSDU that is being filled with one or more MSDUs or an MPDU that is being filled with one or more MSDUs or A-MSDU. The master station 102 and/or HEW station 104 may attempt to fill a A-MSDU or MPDU. The master station 102 and/or HEW station 104 may fragment a MSDU because it is too large to fit in a A-MSDU or MPDU. For example, MSDU 202 (FIG. 2) may be fragmented to fit into A-MSDU 204.1 and A-MSDU 204.2. MSDU 202.5 may be fragmented to fill A-MSDU 204.2.

If the MSDU is not to be fragmented then the method 400 continues at operation 406 with encapsulating the MSDU into a MPDU preceded by a delimiter that indicates a length of the MSDU. For example, MSDU 302.3 is encapsulated in an A-MSDU 304 with a delimiter 358 and then encapsulated into MPDU 306.3. The MPDU 306.3 may have a SOM that is not set because the first portion of the MPDU is not a delimiter indicating the start of a MSDU 302. As another example, MSDU 302.1 may be placed directly into an A-MSDU 304.1 without fragmenting.

If the MSDU is to be fragmented then the method 400 continues at operation 408 with fragment the MSDU into two or more fragments where each fragment is to be encapsulated into a different A-MSDU or MPDU and wherein a delimiter is placed in front of a first fragment of the two or more fragments. For example, MSDU 302.2 is fragmented into fragment 1 350.1, fragment 2 350.2, and fragment 3 350.3. The size and number of fragments may be determined to fill an A-MSDU 304 or MPDU 306. Fragment 1 350.1 is inserted into A-MSDU 304 with delimiter 354 that has the length of all three fragments fragment 1 350.1, fragment 2 350.2, and fragment 3 350.3. A fragment may be encapsulated directly into a MPDU 206.3. For example, MSDU 202.5 may be encapsulated into MPDU 206.3.

In some embodiments, the two or more MSDU fragments may be encapsulated into two or more aggregated MSDUs (A-MSDUs); one or more A-MSDUs and one or more MAC protocol data units (MPDUs); or, two or more MPDUs.

The method 400 continues from both operation 406 and operation 408 at operation 410 with more MSDUs. There may also be other aggregation limits. If there are more MSDUs, then the method 400 returns to operation 402. If there are no more MSDUs, then the method 400 continues at operation 412 with encapsulating each A-MSDU into a MPDU, where if the MPDU comprises the delimiter as a first portion of the MPDU then a SOM subfield is to be set. For example, A-MSDU 304 is encapsulated into MPDU 306 and SOM 308.1 is set because delimiter 350 is the first portion of A-MSDU 304. In some embodiments, the MPDUs 206 are then encapsulated into A-MPDUs 208 as illustrated in FIG. 2. The method 400 may continue at operation 414 end.

Figure 5:
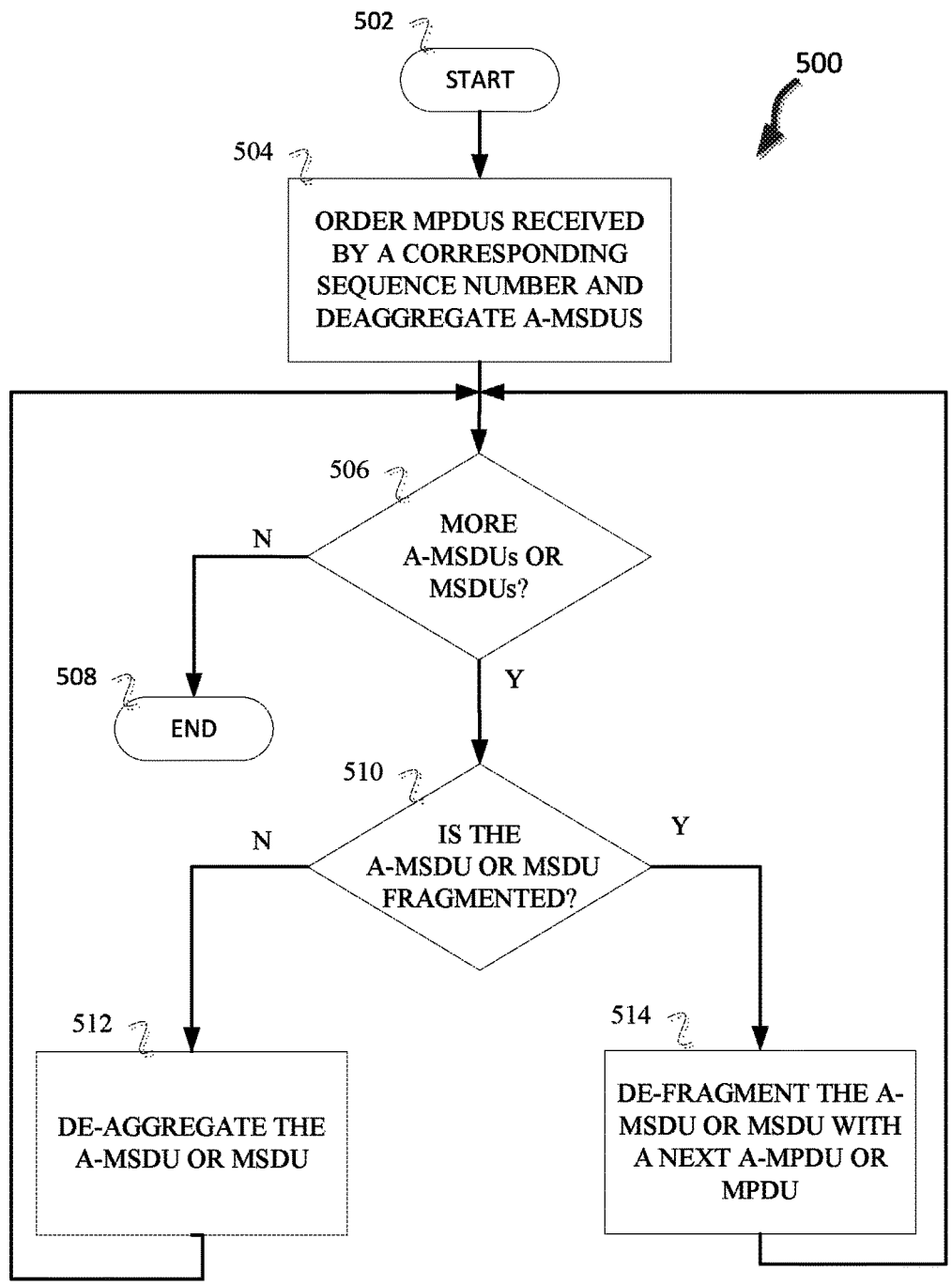
FIG. 5 illustrates a method of fragmentation of service data units in a high-efficiency wireless local-area network in accordance with some embodiments.

FIG. 5 illustrates a method 500 of fragmentation of service data units in a high-efficiency wireless local-area network in accordance with some embodiments. The method 500 may begin at operation 502 with start. The method 500 may continue at operation 504 with ordering received MPDUs by a corresponding sequence number and extracting A-MSDUs and/or MSDUs. For example, a HEW station 104 or master station 102 may receive MPDUs (or A-MPDUs 208) 206, 306. The MPDUs or A-MPDUs may be ordered according to a sequence number (not illustrated) included in the MPDU or A-MPDU. The A-MSDU or MSDU encapsulated in the MPDUs can be extracted. For example, the A-MSDUs 304 can be extracted from the MPDUs 306. As another example, the A-MSDUs 204 can be de-aggregated and/or extracted from the MPDUs 206 and A-MPDUs 208.

The method 500 may continue at operation 506 with determining if there are more A-MSDU or MSDUs. For example, there may be more A-MSDUs 304 de-aggregated or extracted from MPDUs 306. If there are more A-MSDUs or MSDUs, then the method 500 continues at operation 510 with is the A-MSDU or MSDU fragmented. For example, MSDU 302.3 is not fragmented and MSDU 302.2 is fragmented. The master station 102 or HEW station 104 may determine whether or not an MSDU is fragmented based on the delimiter that contains a length of the MSDU. For example, MSDU 352 is not fragmented since delimiter 350 contains a length that indicates the length of MSDU 352. Fragment 1 354 is fragmented since a length indicated in the delimiter 354 is greater than the length of fragment 1 354. The fragment 1 354 may be verified using a cyclic redundancy check.

If the A-MSDU or MSDU is not fragmented then the method 500 continues at operation 512 with de-aggregating the A-MSDU or MSDU. For example, MSDU 302.1 can be extracted from the A-MSDU 304. As another example, MSDU 202.6 can be extracted from MPDU 206.4. The method 500 returns to operation 506.

If the A-MSDU or MSDU is fragmented then the method 500 continues at operation 514 with de-fragmenting the A-MSDU or MSDU with a next A-MPDU or MPDU. For example, the delimiter 354 includes a length that indicates fragment 1 354 is not the full MSDU 302. The method 500 then appends the next A-MSDU or MSDU extracted from the MPDUs 306. Continuing with the example, fragment 2 355, and then fragment 3 355 are appended to form MSDU 302.2. The HEW station 104 and/or master station 102 know when all the fragments are appended together based on the length in the delimiter 354. The method 500 returns to operation 506. The method 500 continues at operation 508 end when there are no more A-MSDU or MSDU to process.

In some embodiments, the method 500 may include operations as part of operation 504 that will skip MPDUs until a next MPDU has a SOM set and abandon any current fragments, if a MPDU is lost. In some embodiments, the fragments are not transmitted in order, in which case a sequence number of the MPDUs may be used to order the MPDUs. The HEW station 104 and/or master station 102 may determine this based on the sequence numbers of the MPDUs (e.g., if a sequence number is missing then it may be assumed lost.)

Larger symbol size and higher data rates are used by IEEE 802.11ax compared with legacy versions of IEEE 802.11. For example, each symbol carries more information (e.g., 16 bits vs. 8 bit). This means that more padding is needed on average to pad the A-MPDU to a symbol boundary. Moreover, the narrow resource unit (RU) supported by IEEE 802.11ax (e.g., down to 26-tone or 2 MHz) means that very low data rates are supported. Additionally, a single resource unit may be used where fragmentation many enable a more data to be sent. Moreover, simultaneous transmissions may need to have the same duration. The fragmentation may enable a higher utilization of the resource unit.

In uplink (UL) multi-user (MU) operation, the physical layer convergence protocol (PLCP) Protocol Data Unit (PPDU) duration is defined by the master station 102. In order to efficiently fill the PPDU, the HEW station 104 and/or master station 102 fragments the last MAC service data unit (MSDU) in order to efficiently fill the allocated time. In some embodiments, the fragmentation enables less padding to be used. In some embodiments the methods of fragmentation reuse legacy IEEE 802.11 block ACK protocols.

Figure 6:
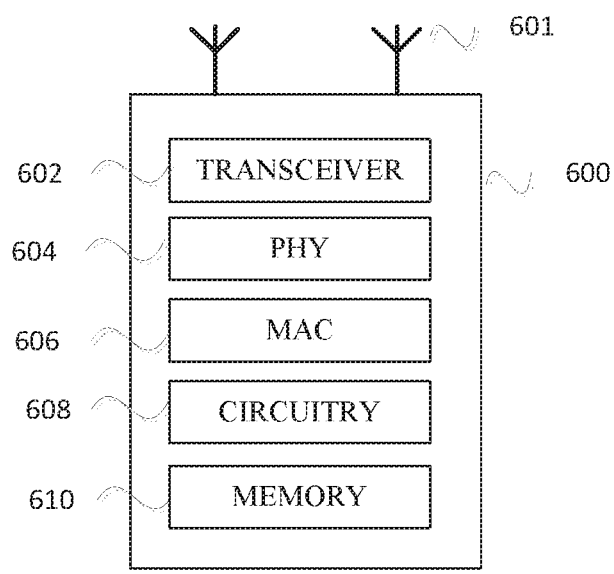
FIG. 6 illustrates a HEW device 600 in accordance with some embodiments.

FIG. 6 illustrates a HEW device 600 in accordance with some embodiments. HEW device 600 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 600 may be suitable for operating as master station 102 (FIG. 1) or a HEW STA 104 (FIG. 1). In accordance with embodiments, HEW device 600 may include, among other things, a transmit/receive element 601 (for example an antenna), a transceiver 602, physical (PHY) circuitry 604, and media access control (MAC) circuitry 606. PHY circuitry 604 and MAC circuitry 606 may be HEW compliant layers and may also be compliant with one or more legacy IEEE 802.13 standards. MAC circuitry 606 may be arranged to configure packets such as a physical layer convergence procedure (PLCP) protocol data unit (PPDUs) and arranged to transmit and receive PPDUs, among other things. HEW device 600 may also include circuitry 608 and memory 610 configured to perform the various operations described herein. The circuitry 608 may be coupled to the transceiver 602, which may be coupled to the transmit/receive element 601. While FIG. 6 depicts the circuitry 608 and the transceiver 602 as separate components, the circuitry 608 and the transceiver 602 may be integrated together in an electronic package or chip.

In some embodiments, the MAC circuitry 606 may be arranged to contend for a wireless medium during a contention period to receive control of the medium for the HEW control period and configure an HEW PPDU. In some embodiments, the MAC circuitry 606 may be arranged to contend for the wireless medium based on channel contention settings, a transmitting power level, and a CCA level.

The PHY circuitry 604 may be arranged to transmit the HEW PPDU. The PHY circuitry 604 may include circuitry for modulation/demodulation, upconversion/downconversion, filtering, amplification, etc. In some embodiments, the circuitry 608 may include one or more processors. The circuitry 608 may be configured to perform functions based on instructions being stored in a RAM or ROM, or based on special purpose circuitry. The circuitry 608 may include processing circuitry and/or transceiver circuitry in accordance with some embodiments. The circuitry 608 may include a processor such as a general purpose processor or special purpose processor. The circuitry 608 may implement one or more functions associated with transmit/receive elements 601, the transceiver 602, the PHY circuitry 604, the MAC circuitry 606, and/or the memory 610.

In some embodiments, the circuitry 608 may be configured to perform one or more of the functions and/or methods described herein and/or in conjunction with FIGS. 1-6.

In some embodiments, the transmit/receive elements 601 may be two or more antennas that may be coupled to the PHY circuitry 604 and arranged for sending and receiving signals including transmission of the HEW packets. The transceiver 602 may transmit and receive data such as HEW PPDU and packets that include an indication that the HEW device 600 should adapt the channel contention settings according to settings included in the packet. The memory 610 may store information for configuring the other circuitry to perform operations for configuring and transmitting HEW packets and performing the various operations to perform one or more of the functions and/or methods described herein and/or in conjunction with FIGS. 1-6.

In some embodiments, the HEW device 600 may be configured to communicate using OFDM communication signals over a multicarrier communication channel. In some embodiments, HEW device 600 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, UniFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 600 may use 4× symbol duration of 802.11n or 802.11ac.

In some embodiments, an HEW device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical or wearable device (e.g., a heart rate monitor, a blood pressure monitor, etc.), an access point, a base station, a transmit/receive device for a wireless standard such as 802.11 or 802.16, 3GPP, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 600 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of an access point or station comprising memory and processing circuitry coupled to the memory. The processing circuitry configured to fragment a media access control (MAC) service data unit (MSDU) into two or more MSDU fragments; and encapsulate the two or more MSDU fragments into two or more aggregated MSDUs (A-MSDUs); one or more A-MSDUs and one or more MAC protocol data units (MPDUs); or, two or more MPDUs.

In Example 2, the subject matter of Example 1 can optionally include where the processing circuitry is further configured to encode a delimiter in front of a first fragment of the two or more MSDU fragments, wherein the delimiter indicates a length of the two or more MSDU fragments.

In Example 3, the subject matter of Examples 1 or 2 can optionally include where the processing circuitry is further configured to encapsulate the two or more aggregated MSDUs (A-MSDUs) or the one or more A-MSDUs into the one or more MPDUs.

In Example 4, the subject matter of Example 3 can optionally include where the processing circuitry is further configured to encode a start of message field in each MPDU of the one or more MPDUs or two or more MPDUs to indicate if the MPDU comprises a fragment of the one or more fragments that does not comprise a delimiter as a first portion of the MPDU.

In Example 5, the subject matter of Example 4 can optionally include where the first portion is four octets.

In Example 6, the subject matter of Example 1 can optionally include where the processing circuitry is further configured to: encode a start of message field in each MPDU of the one or more MPDUs or two or more MPDUs to indicate if a first fragment of the two or more fragments is encoded in the MPDU.

In Example 7, the subject matter of Example 3 can optionally include where the processing circuitry is further configured to encode a start of message field in each MPDU of the one or more MPDUs or two or more MPDUs to indicate if the MPDU comprises a fragment of the one or more fragments that does not comprise a delimiter.

In Example 8, the subject matter of Example 3 can optionally include where the processing circuitry is further configured to: aggregate the one or more MPDUs or two or more MPDUs with one or more other MPDUs into one or more aggregated MPDU (A-MPDU).

In Example 9, the subject matter of Example 8 can optionally include where the processing circuitry is further configured to cause to be transmitted the one or more A-MPDUs.

In Example 10, the subject matter of Example 9 can optionally include where the A-MPDU is to be transmitted in accordance with one or more form the following group: orthogonal frequency division multiple access (OFDMA) and multi-user multiple-input multiple-output (MU-MIMO), and in accordance with Institute of Electrical and Electronic Engineers (IEEE) 802.11ax.

In Example 11, the subject matter of Example 3 can optionally include where the processing circuitry is further configured to encode each MPDU of the one or more MPDUs or two or more MPDUs to comprise a sequence number indicating a cardinal number of the MPDU in a stream of MPDUs or A-MPDUs.

In Example 12, the subject matter of Example 1 can optionally include where the access point or station is at least one from the following group: a high-efficiency wireless local-area network (HEW) station, a master station, an Institute of Electrical and Electronic Engineers (IEEE) 802.11ax access point, and an IEEE 802.11ax station.

In Example 13, the subject matter of Example 1 can optionally include one or more antennas coupled to the processing circuitry.

Example 14 is a non-transitory computer-readable storage medium that stores instructions for execution by one or more processors. The instructions to configure the one or more processors to cause an access point or station to: fragment a media access control (MAC) service data unit (MSDU) into two or more MSDU fragments; and encode the two or more MSDU fragments into two or more aggregated MSDUs (A-MSDUs), one or more A-MSDUs and one or more MAC protocol data units (MPDUs), or two or more MPDUs.

In Example 15, the subject matter of Example 14 can optionally include where the instructions further configure the one or more processors to cause the access point or station to encode a delimiter in front of a first fragment of the two or more MSDU fragments, wherein the delimiter indicates a length of the two or more MSDU fragments.

In Example 16, the subject matter of Example 15 can optionally include where the instructions further configure the one or more processors to cause the access point or station to: encapsulate the two or more aggregated MSDUs (A-MSDUs) or the one or more A-MSDUs into the one or more MPDUs.

In Example 17, the subject matter of Example 16 can optionally include where the instructions further configure the one or more processors to cause the access point or station to: encode each MPDU of the one or more MPDUs or two or more MPDUs to comprise a sequence number indicating a cardinal number of the MPDU in a stream of MPDUs or A-MPDUs.

In Example 18, the subject matter of Example 16 can optionally include where the instructions further configure the one or more processors to cause the access point or station to: encode a start of message field in each MPDU of the one or more MPDUs or two or more MPDUs to indicate if the MPDU comprises a fragment of the one or more fragments that does not comprise a delimiter as a first portion of the MPDU.

Example 19 is a method performed by an access point or station, the method comprising fragmenting a media access control (MAC) service data unit (MSDU) into two or more MSDU fragments; and encapsulating the two or more MSDU fragments into two or more aggregated MSDUs (A-MSDUs); one or more A-MSDUs and one or more MAC protocol data units (MPDUs); or, two or more MPDUs.

In Example 20, the subject matter of Example 19 can optionally include encoding a delimiter in front of a first fragment of the two or more MSDU fragments, wherein the delimiter indicates a length of the two or more MSDU fragments; encapsulating the two or more aggregated MSDUs (A-MSDUs) or the one or more A-MSDUs into the one or more MPDUs; encoding a start of message field in each MPDU of the one or more MPDUs or two or more MPDUs to indicate if the MPDU comprises a fragment of the one or more fragments that does not comprise a delimiter as a first portion of the MPDU; and encoding each MPDU of the one or more MPDUs or two or more MPDUs to comprise a sequence number indicating a cardinal number of the MPDU in a stream of MPDUs or A-MPDUs.

Example 21 is an apparatus of a first access point or station comprising memory, and processing circuitry coupled to the memory. The processing circuitry configured to order two or more media access control (MAC) protocol data units (MPDUs) to be received from a second access point or station by a sequence number of each MPDU of the MPDUs, and wherein each MPDU comprises a MAC service data units (MSDU) or an aggregated (A-MSDU); and de-aggregate the A-MSDU, wherein a delimiter field of the A-MSDU indicates a length of an MSDU, and if the length indicates that the MSDU comprises a first fragment of two or more fragments across one or more subsequent A-MSDUs or MSDUs, then concatenate the two or more fragments together from the one or more subsequent A-MSDUs or MSDUs to form a defragmented MSDU.

In Example 22, the subject matter of Example 21 can optionally include where the processing circuitry is configured to determine that the length indicates that the MSDU comprises a first fragment of two or more fragments if a second length of data of the first fragment in the A-MSDU is less than the length.

In Example 23, the subject matter of Example 21 can optionally include where the processing circuitry is further configured to if a start of message (SOM) subfield of each MPDU of the MPDUs is set, then the A-MSDU comprises the delimiter at a start of the A-MSDU and there are no fragments in the MPDU from a previous MPDU.

In Example 24, the subject matter of Example 21 can optionally include where the access point or station is at least one from the following group: a high-efficiency wireless local-area network (HEW) station, a master station, an Institute of Electrical and Electronic Engineers (IEEE) 802.11ax access point, and an IEEE 802.11ax station.

In Example 25, the subject matter of Example 21 can optionally include one or more antennas coupled to the processing circuitry.

Example 26 is an apparatus of an access point or station. The apparatus comprising means for fragmenting a media access control (MAC) service data unit (MSDU) into two or more MSDU fragments; and means for encapsulating the two or more MSDU fragments into two or more aggregated MSDUs (A-MSDUs); one or more A-MSDUs and one or more MAC protocol data units (MPDUs); or, two or more MPDUs.

In Example 27, the subject matter of Example 26 can optionally include means for encoding a delimiter in front of a first fragment of the two or more MSDU fragments, wherein the delimiter indicates a length of the two or more MSDU fragments.

In Example 28, the subject matter of Example 26 can optionally include means for encapsulating the two or more aggregated MSDUs (A-MSDUs) or the one or more A-MSDUs into the one or more MPDUs.

In Example 29, the subject matter of Example 28 can optionally include means for encoding a start of message field in each MPDU of the one or more MPDUs or two or more MPDUs to indicate if the MPDU comprises a fragment of the one or more fragments that does not comprise a delimiter as a first portion of the MPDU.

In Example 30, the subject matter of Example 29 can optionally include where the first portion is four octets.

In Example 31, the subject matter of Example 29 can optionally include means for encoding a start of message field in each MPDU of the one or more MPDUs or two or more MPDUs to indicate if a first fragment of the two or more fragments is encoded in the MPDU.

In Example 32, the subject matter of Example 29 can optionally include means for encoding a start of message field in each MPDU of the one or more MPDUs or two or more MPDUs to indicate if the MPDU comprises a fragment of the one or more fragments that does not comprise a delimiter.

In Example 33, the subject matter of Example 29 can optionally include means for aggregating the one or more MPDUs or two or more MPDUs with one or more other MPDUs into one or more aggregated MPDU (A-MPDU).

In Example 34, the subject matter of Example 33 can optionally include means for causing to be transmitted the one or more A-MPDUs.

In Example 35, the subject matter of Example 34 can optionally include where the A-MPDU is to be transmitted in accordance with one or more form the following group: orthogonal frequency division multiple access (OFDMA) and multi-user multiple-input multiple-output (MU-MIMO), and in accordance with Institute of Electrical and Electronic Engineers (IEEE) 802.11ax.

In Example 36, the subject matter of Example 29 can optionally include means for encoding each MPDU of the one or more MPDUs or two or more MPDUs to comprise a sequence number indicating a cardinal number of the MPDU in a stream of MPDUs or A-MPDUs.

In Example 37, the subject matter of Example 36 can optionally include where the access point or station is at least one from the following group: a high-efficiency wireless local-area network (HEW) station, a master station, an Institute of Electrical and Electronic Engineers (IEEE) 802.11ax access point, and an IEEE 802.11ax station.

In Example 38, the subject matter of Example 26 can optionally include means for transmitting and receiving radio signals.

Example 39 is an apparatus of a first access point or station comprising memory. The apparatus comprising means for ordering two or more media access control (MAC) protocol data units (MPDUs) to be received from a second access point or station by a sequence number of each MPDU of the MPDUs, and wherein each MPDU comprises a MAC service data units (MSDU) or an aggregated (A-MSDU); and means for de-aggregating the A-MSDU, wherein a delimiter field of the A-MSDU indicates a length of an MSDU, and if the length indicates that the MSDU comprises a first fragment of two or more fragments across one or more subsequent A-MSDUs or MSDUs, then concatenate the two or more fragments together from the one or more subsequent A-MSDUs or MSDUs to form a defragmented MSDU.

In Example 40, the subject matter of Example 39 can optionally include means for determining that the length indicates that the MSDU comprises a first fragment of two or more fragments if a second length of data of the first fragment in the A-MSDU is less than the length.

In Example 41, the subject matter of Example 39 can optionally include where if a start of message (SOM) subfield of each MPDU of the MPDUs is set, then the A-MSDU comprises the delimiter at a start of the A-MSDU and there are no fragments in the MPDU from a previous MPDU.

In Example 42, the subject matter of Example 39 can optionally include where the access point or station is at least one from the following group a high-efficiency wireless local-area network (HEW) station, a master station, an Institute of Electrical and Electronic Engineers (IEEE) 802.11ax access point, and an IEEE 802.11ax station.

In Example 43, the subject matter of Example 39 can optionally include means for receiving and transmitting radio signals.

Example 44 is a non-transitory computer-readable storage medium that stores instructions for execution by one or more processors. The instructions to configure the one or more processors to cause an access point or station to order two or more media access control (MAC) protocol data units (MPDUs) to be received from a second access point or station by a sequence number of each MPDU of the MPDUs, and wherein each MPDU comprises a MAC service data units (MSDU) or an aggregated (A-MSDU); and de-aggregate the A-MSDU, wherein a delimiter field of the A-MSDU indicates a length of an MSDU, and if the length indicates that the MSDU comprises a first fragment of two or more fragments across one or more subsequent A-MSDUs or MSDUs, then concatenate the two or more fragments together from the one or more subsequent A-MSDUs or MSDUs to form a defragmented MSDU.

In Example 45, the subject matter of Example 44 can optionally include where the instructions further configure the one or more processors to cause the access point or station to determine that the length indicates that the MSDU comprises a first fragment of two or more fragments if a second length of data of the first fragment in the A-MSDU is less than the length.

In Example 46, the subject matter of Example 44 can optionally include where the instructions further configure the one or more processors to cause the access point or station to if a start of message (SOM) subfield of each MPDU of the MPDUs is set, then the A-MSDU comprises the delimiter at a start of the A-MSDU and there are no fragments in the MPDU from a previous MPDU.

In Example 47, the subject matter of Example 44 can optionally include where the access point or station is at least one from the following group: a high-efficiency wireless local-area network (HEW) station, a master station, an Institute of Electrical and Electronic Engineers (IEEE) 802.11ax access point, and an IEEE 802.11ax station.

Example 48 is a method performed by a first access point or station. The method comprising: ordering two or more media access control (MAC) protocol data units (MPDUs) to be received from a second access point or station by a sequence number of each MPDU of the MPDUs, and wherein each MPDU comprises a MAC service data units (MSDU) or an aggregated (A-MSDU); and de-aggregating the A-MSDU, wherein a delimiter field of the A-MSDU indicates a length of an MSDU, and if the length indicates that the MSDU comprises a first fragment of two or more fragments across one or more subsequent A-MSDUs or MSDUs, then concatenate the two or more fragments together from the one or more subsequent A-MSDUs or MSDUs to form a defragmented MSDU.

In Example 49, the subject matter of Example 48 can optionally include determining that the length indicates that the MSDU comprises a first fragment of two or more fragments if a second length of data of the first fragment in the A-MSDU is less than the length.

In Example 50, the subject matter of Example 48 can optionally include if a start of message (SOM) subfield of each MPDU of the MPDUs is set, then the A-MSDU comprises the delimiter at a start of the A-MSDU and there are no fragments in the MPDU from a previous MPDU.

In Example 51, the subject matter of Example 48 can optionally include where the access point or station is at least one from the following group: a high-efficiency wireless local-area network (HEW) station, a master station, an Institute of Electrical and Electronic Engineers (IEEE) 802.11ax access point, and an IEEE 802.11ax station.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point or station comprising: memory; and, processing circuitry coupled to the memory, the processing circuitry configured to:
   fragment a media access control (MAC) service data unit (MSDU) into two or more MSDU fragments;
   encode a delimiter in front of a first fragment of the two or more MSDU fragments, wherein the delimiter indicates a length of the two or more MSDU fragments;
   encapsulate the two or more MSDU fragments into two or more aggregated MSDUs (A-MSDUs), one or more A-MSDUs and one or more MAC protocol data units (MPDUs), or two or more MPDUs;

encapsulate the two or more aggregated MSDUs (A-MS-DUs) or the one or more A-MSDUs into the one or more MPDUs or the two or more MPDUs; and
encode a start of message field in each MPDU of the one or more MPDUs or two or more MPDUs to indicate if a first fragment of the two or more fragments is encoded in the MPDU.

2. The apparatus of claim 1, wherein the processing circuitry is further configured to:
encode a start of message field in each MPDU of the one or more MPDUs or two or more MPDUs to indicate if the MPDU comprises a fragment of the one or more fragments that does not comprise a delimiter as a first portion of the MPDU.

3. The apparatus of claim 2, wherein the first portion is four octets.

4. The apparatus of claim 1, wherein the processing circuitry is further configured to:
encode a start of message field in each MPDU of the one or more MPDUs or two or more MPDUs to indicate if the MPDU comprises a fragment of the one or more fragments that does not comprise a delimiter.

5. The apparatus of claim 1, wherein the processing circuitry is further configured to:
aggregate the one or more MPDUs or two or more MPDUs with one or more other MPDUs into one or more aggregated MPDU (A-MPDU).

6. The apparatus of claim 5, wherein the processing circuitry is further configured to:
cause to be transmitted the one or more A-MPDUs.

7. The apparatus of claim 6, wherein the A-MPDU is to be transmitted in accordance with one or more form the following group: orthogonal frequency division multiple access (OFDMA) and multi-user multiple-input multiple-output (MU-MIMO), and in accordance with Institute of Electrical and Electronic Engineers (IEEE) 802.11ax.

8. The apparatus of claim 1, wherein the processing circuitry is further configured to:
encode each MPDU of the one or more MPDUs or two or more MPDUs to comprise a sequence number indicating a cardinal number of the MPDU in a stream of MPDUs or A-MPDUs.

9. The apparatus of claim 1, wherein the access point or station is at least one from the following group: a high-efficiency (HE) station, a master station, an Institute of Electrical and Electronic Engineers (IEEE) 802.11ax access point, and an IEEE 802.11ax station.

10. The apparatus of claim 1, further comprising one or more antennas coupled to the processing circuitry.

11. The apparatus of claim 1, wherein the memory is configured to store the MSDU.

12. A non-transitory computer-readable storage medium that stores instructions for execution by one or more processors, the instructions to configure the one or more processors to cause an access point or station to:
fragment a media access control (MAC) service data unit (MSDU) into two or more MSDU fragments;
encode a delimiter in front of a first fragment of the two or more MSDU fragments, wherein the delimiter indicates a length of the two or more MSDU fragments;
encode the two or more MSDU fragments into two or more aggregated MSDUs (A-MSDUs), one or more A-MSDUs and one or more MAC protocol data units (MPDUs), or two or more MPDUs;
encapsulate the two or more aggregated MSDUs (A-MS-DUs) or the one or more A-MSDUs into the one or more MPDUs or the two or more MPDUs; and
encode a start of message field in each MPDU of the one or more MPDUs or two or more MPDUs to indicate if the MPDU comprises a fragment of the one or more fragments that does not comprise a delimiter as a first portion of the MPDU.

13. The non-transitory computer-readable storage medium of claim 12, wherein the instructions further configure the one or more processors to cause the access point or station to: encode each MPDU of the one or more MPDUs or two or more MPDUs to comprise a sequence number indicating a cardinal number of the MPDU in a stream of MPDUs or A-MPDUs.

14. A method performed by an access point or station, the method comprising:
fragmenting a media access control (MAC) service data unit (MSDU) into two or more MSDU fragments;
encapsulating the two or more MSDU fragments into two or more aggregated MSDUs (A-MSDUs), one or more A-MSDUs and one or more MAC protocol data units (MPDUs), or two or more MPDUs;
encoding a delimiter in front of a first fragment of the two or more MSDU fragments, wherein the delimiter indicates a length of the two or more MSDU fragments;
encapsulating the two or more aggregated MSDUs (A-MSDUs) or the one or more A-MSDUs into the one or more MPDUs or the two or more MPDUs;
encoding a start of message field in each MPDU of the one or more MPDUs or two or more MPDUs to indicate if the MPDU comprises a fragment of the one or more fragments that does not comprise a delimiter as a first portion of the MPDU; and
encoding each MPDU of the one or more MPDUs or two or more MPDUs to comprise a sequence number indicating a cardinal number of the MPDU in a stream of MPDUs or A-MPDUs.

15. An apparatus of a first access point or station comprising: memory; and, processing circuitry coupled to the memory, the processing circuitry configured to:
order two or more media access control (MAC) protocol data units (MPDUs) to be received from a second access point or station by a sequence number of each MPDU of the MPDUs, and wherein each MPDU comprises a MAC service data units (MSDU) or an aggregated (A-MSDU); and
de-aggregate the A-MSDU, wherein a delimiter field of the A-MSDU indicates a length of an MSDU, and if the length indicates that the MSDU comprises a first fragment of two or more fragments across one or more subsequent A-MSDUs or MSDUs, then concatenate the two or more fragments together from the one or more subsequent A-MSDUs or MSDUs to form a defragmented MSDU, and if a start of message (SOM) subfield of each MPDU of the MPDUs is set, then the A-MSDU comprises the delimiter at a start of the A-MSDU and there are no fragments in the MPDU from a previous MPDU.

16. The apparatus of claim 15, wherein the processing circuitry is configured to:
determine that the length indicates that the MSDU comprises a first fragment of two or more fragments if a second length of data of the first fragment in the A-MSDU is less than the length.

17. The apparatus of claim 15, wherein the access point or station is at least one from the following group: a high-efficiency (HE) wireless local area network (HEW) station, a master station, an Institute of Electrical and Electronic Engineers (IEEE) 802.11ax access point, and an IEEE 802.11ax station.

18. The apparatus of claim 15, further comprising one or more antennas coupled to the processing circuitry.

19. The apparatus of claim 15, wherein the memory is configured to store the two or more MPDUs.

\* \* \* \* \*